United States Patent
Yang et al.

(10) Patent No.: US 7,463,682 B2
(45) Date of Patent: Dec. 9, 2008

(54) CODING METHOD FOR BINARY DIGITS CODING AND ITS CIRCUIT FOR DIGITS TRANSMISSION

(75) Inventors: Zhangyuan Yang, Beijing (CN); Li Guo, Beijing (CN); Yanhua Wang, Beijing (CN)

(73) Assignee: Institute of Process Engineering, Chinese Academy of Sciences (CN)

( * ) Notice: Subject to any disclaimer, the term of this patent is extended or adjusted under 35 U.S.C. 154(b) by 738 days.

(21) Appl. No.: 10/629,794

(22) Filed: Jul. 30, 2003

(65) Prior Publication Data

US 2004/0071208 A1    Apr. 15, 2004

(30) Foreign Application Priority Data

Jul. 31, 2002   (CN)  ................. 02 1 25876

(51) Int. Cl.
  *H03K 7/00*  (2006.01)
(52) U.S. Cl. .............. 375/237; 375/279; 375/272; 375/222; 375/236; 370/252; 370/432; 370/468
(58) Field of Classification Search ................ 375/327, 375/373, 361, 112, 239, 237, 238, 242, 246, 375/253, 279, 272, 222, 236; 332/109, 112; 329/313; 340/825; 370/252, 432, 468
See application file for complete search history.

(56) References Cited

U.S. PATENT DOCUMENTS

| | | | | |
|---|---|---|---|---|
| 3,355,553 A | * | 11/1967 | Masahisa | ............. 370/491 |
| 3,582,783 A | * | 6/1971 | Hendrickson | .......... 340/825.58 |
| 4,025,917 A | * | 5/1977 | DuBrul | ..................... 341/52 |
| 4,314,371 A | * | 2/1982 | Covington et al. | .......... 375/285 |
| 4,374,438 A | * | 2/1983 | Crowley | .................... 455/265 |
| 4,661,965 A | * | 4/1987 | Maru | ........................ 375/361 |
| 5,182,442 A | * | 1/1993 | Takahira | .................... 235/492 |
| 5,343,555 A | * | 8/1994 | Yayla et al. | .................. 706/35 |
| 5,495,209 A | * | 2/1996 | Gerstenberg | ............... 332/108 |
| 5,640,160 A | * | 6/1997 | Miwa | ......................... 341/53 |
| 5,949,826 A | * | 9/1999 | Iiyama et al. | ............... 375/279 |
| 6,181,255 B1 | * | 1/2001 | Crimmins et al. | ...... 340/825.69 |
| 7,199,376 B2 | * | 4/2007 | Prange et al. | ............. 250/458.1 |
| 2002/0021621 A1 | * | 2/2002 | Haase et al. | ................ 367/118 |
| 2005/0207505 A1 | * | 9/2005 | Lakkis | ....................... 375/260 |

OTHER PUBLICATIONS

"ADSL2 and ADSL2plus- The New ADSL Standards," DSL Forum, Mar. 25, 2003.

* cited by examiner

*Primary Examiner*—Chieh M. Fan
*Assistant Examiner*—Eva Puente
(74) *Attorney, Agent, or Firm*—Perkins Coie, LLP; Manni Li

(57) ABSTRACT

This invention presents a coding method for binary digits coding and its circuit for digits transmission. With this coding method, the binary digits are corresponding to a sequence of pulse groups. The binary digits "0" and "1" are corresponding to the two pulse groups with same defined number of pulses and with two special defined pulse frequencies respectively. The two pulse groups have the same defined number of pulses. The number is at least 2. The corresponding decoding method divides the sequence of pulse groups, according to the same defined number, into a set of pulse groups. The duration time of each pulse group is measured. The binary digits "0" and "1" are corresponding to the differences of the duration time of the pulse groups.

6 Claims, 1 Drawing Sheet

CODING METHOD FOR BINARY DIGITS CODING AND ITS CIRCUIT FOR DIGITS TRANSMISSION

FIELD OF THE INVENTION

The present invention relates the field of digital data communication, particularly to the coding/decoding method and the circuit of using this method for digital data transmission.

BACKGROUND OF THE INVENTION

ADSL (Asymmetric Digital Subscriber Line) is a technology that uses the ordinary copper phone line for high-speed Internet connection. ADSL is currently undergoing deployment in North America, parts of Europe, as well as parts of China.

The Discrete Multitone (DMT) modulation is the choice for ADSL. As a standard, DMT is adopted internationally by American National Standards Institute (ANSI), European Telecommunications Standards Institute (ETSI) and the International Telecommunications Union (ITU). There is a complete specification and there are numerous independent manufacturers developing DMT technology.

DMT's ANSI T1.413 standard specifies 256 sub-channels, each with a 4 kHz bandwidth. They can be independently modulated from zero to a maximum of 15 bits/sec/Hz. This allows up to 60 kbps per sub-channel. At low frequencies, where copper wire attenuation is low and signal to noise ratio (SNR) is good, it's common to use a very dense constellation—greater than 10 bits/Hz is typical. In unfavorable line conditions, modulation can be relaxed to accommodate lower SNR—usually 4 bits/Hz or less.

In July 2002, the ITU completed G.992.3 and G.992.4 as new standards for ADSL called ADSL2. ADSL2 has been designed to improve the rate and reach of ADSL. On long telephone lines ADSL2 provide a data rate increase of 50 kbps. This results in an increase in reach of about 600 feet (with original data rate). At the loop reach as 20 kilo feet (about 6 km), the data rate increases from original ADSL's 100 kbps to the new ADSL2's 150 kbps.

SUMMARY OF THE INVENTION

The purpose of the present invention is to improve the digital signal transmission rate and reach, and a new digital signal coding method and its circuit for digital signal transmission is provided.

For this purpose, the present invention provides a binary digital signal coding method that the entire binary digital signal are represented by a sequence of pulse group. In this method, the binary digits "0" and "1" are corresponding to two special pre-defined pulse frequencies respectively. The two pulse groups have the same pre-defined number of pulses which is at least 2. This coding method may be called Pulse Group Duration coding (PGD).

The present invention also provides a decoding method. The sequence of pulse groups is divided into a set of pulse groups, according to the same pre-defined number. The duration time of each pulse group is measured. The binary digits "0" or "1" is corresponding to a pulse group according to the differences of the duration time of the pulse groups. The duration time is the total time of the periods of all the pulses in the group, or is the sum of the periods of part of specially defined pulses in the pulse group.

Furthermore, the present invention provides a digital signal transmission method which includes the process of sending the binary signals from the transmission side to the reception side through the medium.

At the transmission side, the binary digits are expressed as a sequence of pulse groups and the sequence of pulse groups is sent to the medium. The digits "0" and "1" are expressed by the two pulse groups with two special pulse frequencies and with same pre-defined number of pulses. The two pulse groups have the same defined number of pulses.

At the reception side, the sequence of pulse groups is received and divided according to the pre-defined number. The duration time of the pulse groups in the sequence of pulse groups are measured and the duration time differences of the pulse groups are used to express the binary digits "0" and "1".

The said digital signal transmission procedure is carried out within one sub-channel or a plurality of sub-channels which is within the whole bandwidth of the medium. The said two special frequencies are located in the sub-channel. The said each of the two special frequencies is located at the each side of the central frequency of the sub-channel.

Before the normal digital transmission, a synchronous process is performed for synchronizing the data transmission and reception and for correctly dividing the sequence of pulse groups into the said pulse groups. This procedure is as follows:

The mark number, a pre-selected multi bytes binary number, is sent from the transmission side repeatedly, and the signals are received at the signal reception side. If the received number is not the same with the said mark number, one pulse is canceled before the next time in comparing the received number with the said mark number until the same number is received.

The present invention also provides the implementation circuit of the digital signal transmission. The circuit comprises:

The transmission medium, which is used for the pulse signal transmission;

The coding module, which located in transmission side and used to convert the binary digits into a sequence of pulse groups in which the digits "0" and "1" are corresponding to the pulse groups consisting of same said pre-defined number of pulses and with two said special pre-defined frequencies; The pulse groups consist of same pre-defined number of pulses, and the said pre-defined number is at least 2;

The band filer and amplifier module, which is located in the reception side and used for the signal band filtering and amplifying;

The synchronous module, which is connected with the band filter and amplifier module and used for synchronizing the signal transmission and reception, and dividing the said sequence of pulse groups into said pulse groups;

The decoding module, which is connected to the synchronous module and used for dividing the said sequence of the pulse groups into the pulse groups according to the said defined number; This module is also used for measuring the duration time of each pulse group and converting the said duration time differences into binary digits "0" or "1".

The said coding module comprises:

The interface, which is used for converting the transmitting digits into serial signals and sending the binary digits logical levels to the voltage level transfer circuit;

The voltage level transfer circuit, which is used for transferring the binary logical levels into two special voltage levels;

The voltage/frequency converter, which is used for generating the pulses with said two special frequencies according to the input two said special voltage levels;

The binary counter, which is used for counting the pulses generated by the voltage/frequency converter, and as the said defined number of pulses is counted it controls interface to output the next digit bit.

The said de-coding module comprises:

The binary counter, which is used for counting the pulses in the said sequence of pulse groups, as the said defined number of pulses is reached, it controls the pulse group duration time measurement unit to measure the pulse group duration time;

The pulse group duration time measurement unit, which is used for measuring the duration time of the pulse groups and output "low" or "high" voltage levels according to the difference of the duration time of the pulse groups for expressing the binary digits "0" or "1";

The interface, which is used for receiving the voltage outputs from the pulse group duration time measurement unit, and converting them as the binary logical voltage levels.

The said filter and amplifier module comprising filters and amplifiers.

The said synchronous module comprising:

The pulse canceling circuit, which is used for each time canceling one pulse;

The comparator, which is used for comparing the number output from decoding module with a said pre-selected mark number. If it is not the same, it controls the pulse canceling circuit to cancel one pulse from the sequence of the pulse groups, whereas if it is the same, the pulse canceling circuit will not work.

The said transmission medium includes telephone line, co-axis cable and electromagnetic field.

The Pulse Group Duration (PGD) coding method has the following advantages:

1) The average transmission rate of PGD sub-channel is over 120 kbps, while the maximum rate of other related method in the world is 60 kbps.

2) The experiment shows that PGD's sub-channel can work at the maximum rate in a 6 km long telephone, while the other related technique in the world can work at the maximum data transmission rate only on the lines shorter than 2 km and the signal to noise ratio is good.

3) PGD's implementation is quite simple. Compared with the other complicated coding method, PGD can get a more reliable digital transmission with a lower cost.

4) As the refining on PGD technique, we can enhance the measurement precision of pulse duration time and use more sub-channels to get the higher total transmission rate.

5) The rate of PGD sub-channel is direct proportion to the central frequency of the sub-channel. So we can get the higher transmission rate in a transmission medium with higher working frequency.

DETAILED DESCRIPTION OF PREFERRED EMBODIMENT

The following is the detailed description of the preferred embodiment as shown in the FIG.

This invention presents a coding method with which the bandwidth of the digits transmission medium is divided into many sub-channels. Two special frequencies are selected located at the two sides of the central frequency of the sub-channel. In the data transmission side, the pulse groups are generated corresponding to the two special frequencies. The duration time differences of the pulse groups are used to express the binary digits "0" and "1". In this way pulse group duration coding is achieved. Shown as FIG. 1, the central frequency is fc in sub-channel 1, the frequencies f0 and f1 located at the two sides of the central frequency are selected as the two special frequencies. The first pulse group 2 corresponding to the frequency f0 has the duration time t0; the second pulse group 3 corresponding to the frequency f1 has the duration time t1. Notice that the first pulse group 2 and the second pulse group 3 have the same number of pulses, as the defined number n, and they have different frequencies. The first pulse group 2 and the second pulse group 3 have different duration time. The difference in pulse group duration time can be used to make difference between the two pulse groups and further more make the difference between the binary digits "0" and "1". Shown as FIG. 2, a binary digits "10011101" is corresponding to a sequence of pulse groups.

Figure 1:
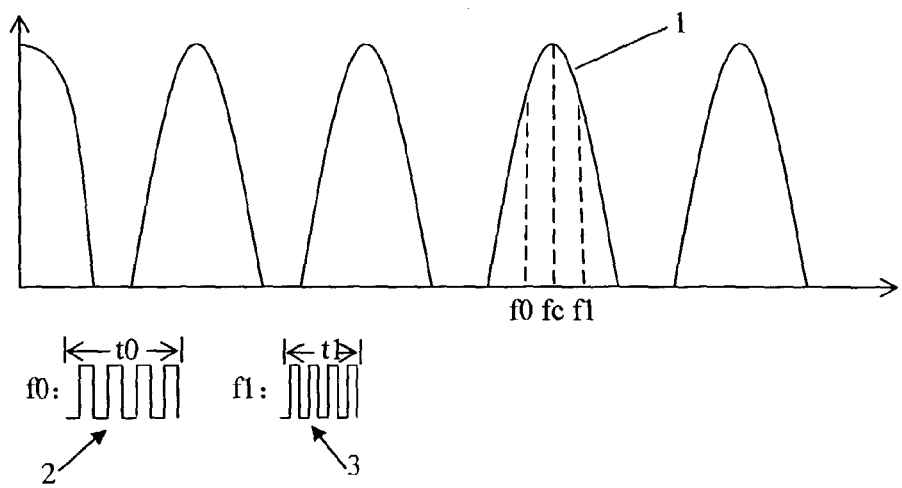
FIG. 1 is PGD coding method illustration according to the present invention.
Figure 2:
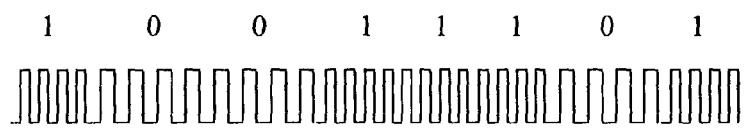
FIG. 2 is an embodiment of the PGD coding method according to the present invention.

In the FIG. 1, and FIG. 2, the first pulse group 2 and the second pulse group 3 have the same pulse number n, here the n equals to 4. In using the telephone lines as the medium for digits transmission, the number n is selected according to the length of the line and its signal to noise ratio (SNR). As the digits are transmitted on a long line, the number n is selected as a large number to ensure the duration time measurement of the pulse groups and minimum miscoding. But to increase the number n will decrease the data transmission rate. As the length of the telephone line is about 6 km the number n can be selected as 4. When the line is very short, the number n can be selected as small one. This will increase the data transmission rate.

In the signal transmission side, the binary digits are coded in the sub-channels and the coded pulse signals are sent parallel on the medium. In the reception side, the signals in each sub-channel are received parallel. The duration time of each pulse group in all the sub-channel is measured for the binary digits decoding. As shown in FIG. 2, the received sequence of the pulse groups is divided into pulse groups, and each pulse group has 4 pulses. In measuring the duration time of the pulse groups, two values t0 and t1 are obtained. The t0 is corresponded to the digit "0" and the t1 is corresponded to the digit "1". The received sequence of pulse groups is decoded as the binary digits "10011101".

The Pulse Group Duration coding method is different from other carrier modulation method. In carrier modulation method the carrier does not take part of the digits coding. Only the modulation waves take part of the coding procedure. For the Pulse Group Duration coding method it has no carrier or modulation waves. With the Pulse Group Duration coding method two frequencies are selected within a sub-channel. Corresponding to the two frequencies the pulse groups are generated to present the binary digits "0" and "1".

For large amount of digits transmission, the opportunity of the digit "0" is equal to the opportunity of digit "1". To select n as the number of the pulses in a pulse group, f0 and f1 as the frequencies in a sub-channel for binary digits coding, fc as the central frequency of the sub-channel, the central frequency fc can be expressed as:

$$fc=(f0+f1)/2$$

The data transmission rate of a sub-channel, Sr (in bit per second), equals to the central frequency divided by the number n:

$$Ss=fc/n$$

From the equation above, the data transmission rate of a sub-channel is proportional to the central frequency of the sub-channel and inverse proportional to the number n. When multi sub-channel is used, the total data transmission rate equals to the sum of data rates of all the sub-channels.

The sub-channel bandwidth dividing is determined by the technical of the receiver in measuring the time difference of the pulse groups. If the receiver circuit has the accuracy of r % in measuring the time difference of the pulse group, the bandwidth of the sub-channel Bs can be:

$$Bs=*r\%$$

For telephone lines, besides the POTS the bandwidth can be divided for up load and down load bandwidth. Suppose the receiver circuit has the ability to identify 1% time difference in measuring pulse group duration, the whole bandwidth can be divided as 50 sub-channels. The average data rate of the sub-channels is about 120 kbps; the total data rate is 6M bps. To increase the accuracy in measuring the time differences of the pulse group duration, the more sub-channels can be divided and the higher data rate can be achieved.

For correct data transmission and receiving it must correctly divide each pulse group and each byte. At the same time the data transmission and receiving must be synchronous. It is important for data transmission and receiving. It is noticed in the Pulse Group Duration coding method, a pulse group is consist of n pulses, a bit is expressed by a pulse group. The elements of the pulse groups and bits are the pulses. In applying pulse group duration method for data transmission it must have the same start pulse for each pulse group at both the data transmission and receiving side. To identify the start pulse a protocol is made as follows:

Firstly, a binary number P, consisted of m bytes, is selected and sent from the data transmission side. At data receiving side, the received data are compared with P. If the received number is not the same with P, the number P will be sent from transmission side again. At this time one pulse should be canceled from the received serial pulses before the received number is compared with P. This procedure will be repeated again and again until the number P is correctly received at the data receive side. The P might be sent many times. The maximum times of sending the number P is equal to 8*n*m. After the pulse groups and the bytes are correctly divided from received serial pulses, both the data transmission and receive sides are ready for normal data transfer. The two interfaces at the both data transmission and receive side are responsible for the synchronous between the computers and circuits. The above protocol can be executed by a special designed hardware or by a hardware works together with the relative software.

With the method above, a typical application circuit has been designed and made to transfer full duplex digital signals over 6 kilometers telephone line (26AWG) between two computers. It comprises of two down load sub-channels and an up load sub-channel. The central frequency of the three sub-channels are 520 kHz, 450 kHz and 350 kHz respectively. The number n for the pulse group of the three sub-channels is selected as 4. With this application circuit, digital transmission over 6 kilometers telephone line is achieved with the total rate 330 kbps.

Figure 3:
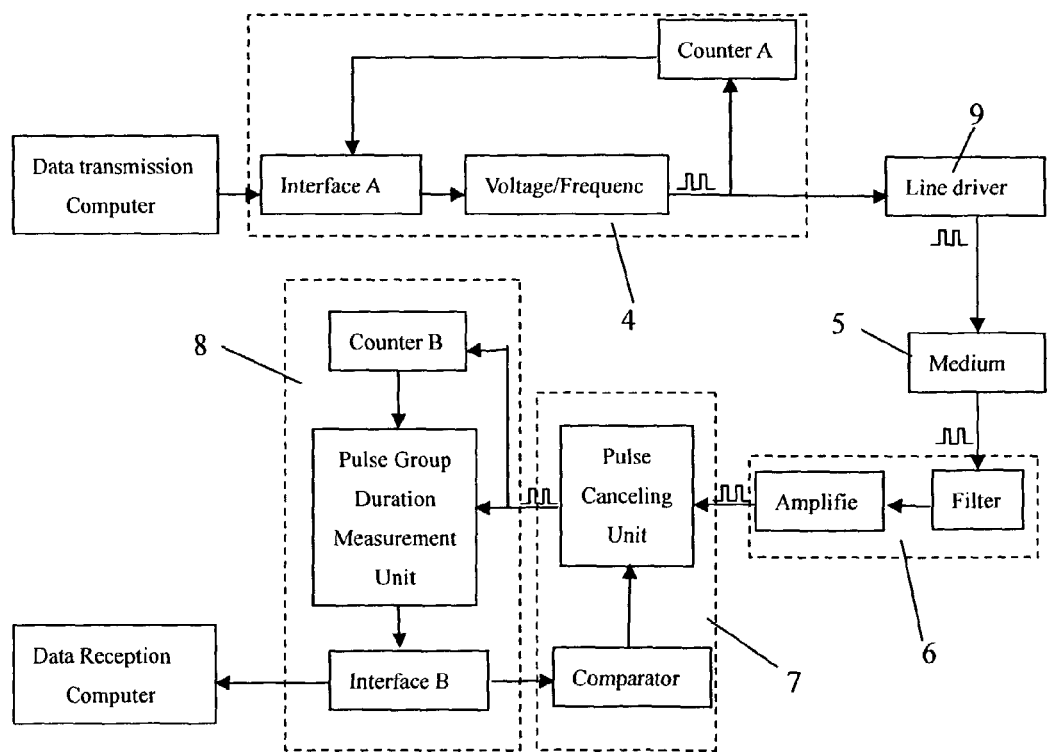
FIG. 3 is a typical PGD coding method application circuit block diagram according to the present invention.

This application circuit is shown as FIG. 3. In applying the method in this invention this circuit executes the coding, decoding, and digital signal transmission. This circuit comprises the coding circuit 4, decoding circuit 8, telephone line 5, the filter and amplify module 6, the synchronous module 7, and the line driver 9.

In the FIG. 3, the interface A is an I/O interface controlled by the counter A. Each time when it accepts a signal from the counter A, it accepts a byte of digits parallel from the data transmission computer. The digits in this byte are shifted out one by one. In this way this byte of digits become serial data output from interface A. The digits present as TTL "high" and "low" voltage level.

In the interface A, the TTL voltage levels are further converted into two special voltage levels. These two special levels are used to control the voltage/frequency converter to generate pulses with two special frequencies. For example, the TTL logical levels are converted to two special levels: 4.1 v and 4.0 v used for the voltage/frequency converter to generate pulses with the two frequencies 523 kHz and 517 kHz.

In this typical application, one pulse group consists of 4 pulses. The binary counter counts the pulses generated from voltage/frequency converter. As the fourth pulse is counted, it gives a signal to control the interface A to shift one bit for generating next 4 pulses. These 4 pulses are used to constitute a pulse group. Its duration time is controlled by the state of the bit "0" or "1". In this way, the pulse group duration coding is achieved. These pulse groups are sent to a line driver which sends the signals over a telephone line (26AWG), in length of 6 km, for data transmission At another end of the telephone line, the signals are received. The reception circuit uses $6^{th}$ order filer. The bandwidth of the filter is designed to meet the bandwidth of the sub-channel in the data transmission side. For example, for the sub-channel with central frequency 520 kHz, the bandwidth of the filter at the data reception side is designed between 523 kHz and 517 kHz. At the same time of band filter the signals are amplified. The total amplify rate is about 10000. The amplitude of the output from amplifier is limited in the range between 0 v to 4.0 v.

The limited amplitude signals are used to drive the related TTL logical circuit in the reception circuit. The counter B in the reception side counts the received pulses. Each time as it counts the fourth pulse, it takes the four pulses as a pulse group. The pulse group duration time measurement unit is controlled to measure the pulse group duration time.

In this typical application, the pulse group duration time measurement is substituted by measuring the duration time of the second pulse and third pulse in the pulse group with 4 pulses. An integrator is used here. At the time of the period of second and third pulse, a gate is open for charging the integrator with a constant electric current. Through two period time of charging, the voltage value at the integrator is proportional to the time of the two periods of the two pulses. At the time of the fourth pulse of this pulse group this voltage is kept and measured. And at the first pulse time of the next pulse group the integrator is discharged. This process is going repeatedly and generates a serial of voltage levels.

In this typical application, the pulse group duration time measurement is substituted by measuring the duration time of the second pulse and third pulse in the pulse group with 4 pulses. It has two reasons to like this. The first reason is to arrange the time for charging the integrator, measuring the charge on the integrator, and discharging the integrator;

another reason is more important for achieving a reliable measurement to the duration time of the pulse groups. In the long line signals transmission, the frequency change between two pulse groups needs some interim time. The second and the third pulses are located in the middle of the pulse group that avoids the interim time of the frequency change. Reliable measurement of the duration time of the two pulses is achieved, which is proportional to the whole duration time of the pulse group, and can be used as the substitution to the whole duration time of the pulse group.

The duration time of the pulse group is expressed by the voltage value at the capacitor of the integrator. The higher voltage at the capacitor expresses longer time duration of the pulse group, and the lower voltage at the capacitor expresses shorter time duration of the pulse group. To convert the two voltage values into TTL logical levels, the decoding is achieved. These TTL logical levels are the serial signals. In this typical application circuit, these serial signals are converted into 8 bits parallel signals by the interface B, and sent to the reception computer.

In the FIG. 3, the synchronous module 7 is used for synchronize the transmission signals with the reception signals that comprising: the pulse canceling unit and the comparator. The comparator compares the decoded signals from decoding module 8 with a pre-selected mark number. If they are not the same, the pulse canceling unit will cancel one pulse. If it is the same, the pulse canceling unit will not work. For example, A 4 bytes said mark number P is selected. Send the P from data transmission side repeatedly. In the comparator, the received 4 bytes number is compared with P. The pulse canceling unit will cancel one pulse from received sequence of the pulse groups, and the comparator starts the next 4 bytes number compare. These compare process is going repeatedly until the mark number P is received. In this time the received sequence of the pulse groups is divided correctly and both the data transmission and reception side are ready for normal digital data transmission.

In the typical application circuit, two down load sub-channels and one up load sub-channel are comprised with full duplex digital data transmission. In both the data transmission and reception sides the commercial DSL driver and the relative circuits are used for signals drive and echo-canceling.

In the typical application circuit the telephone line is used as the digital data transmission medium. The method in this invention can be applied to other mediums. For example, the method in this invention can be used for digital signal transmission over coaxial cable or other electric cable. The method in this invention also can be used for wireless digital signal transmission, that medium is the electromagnetic wave.

What is claimed is:

1. A digital signal transmission method, comprising a process of sending and transferring binary signals generated from binary digit signals "0" and "1" from a transmission side to a reception side, wherein, at the transmission side, the binary signals are expressed as a sequence of pulse groups; the binary signals "0" and "1" are expressed by two pulse groups with two special pulse frequencies and with same defined number of pulses and thus with different duration times; and sending the sequence of pulse groups to a medium; wherein, at the reception side, the sequence of pulse groups is received and divided according to the same defined number; the duration times of the pulse groups in the sequence of pulse groups are measured and the duration time differences of the pulse groups are used to express binary digits "0" and "1";

wherein a synchronous process is included before sending the sequence of pulse groups for synchronizing the data transmission and reception and correctly dividing the sequence of pulse groups into the pulse groups; and wherein the synchronous process is as follows: a mark number, a pre-selected multi bytes binary number, is sent from the transmission side repeatedly, and a received number is received at the signal reception side; if the received number is not the same as the mark number, one pulse is canceled before next time in comparing the received number with the mark number, until the same number is received.

2. A coding circuit for executing a coding method for binary digits comprising the step of transforming a series of binary digits generated from binary digits "0" and "1" into a sequence of pulse groups, wherein the binary digits "0" and "1" in the series of binary digits are transformed respectively into two pulse groups which have two different special defined pulse frequencies and have same defined number of pulses thereby having different duration times, and the defined number is at least two, said coding circuit comprising a coding module used for convert the binary digits into a sequence of pulse groups in which the digits "0" and "1" are corresponding to the pulse groups consist of same said defined number of pulses and with two said special defined pulse frequencies and different duration times; the pulse groups consist of same defined number of pulses; the defined number is at least 2, wherein said coding module comprises an interface for converting the transmitting digits into serial signals and sending the binary digits logical levels to a voltage level transfer circuit;

a voltage level transfer circuit for transferring the binary logical levels into two special voltage levels;

a voltage/frequency converter for generating the pulses with said two special defined pulse frequencies according to an input of two said special voltage levels; and a binary counter for counting the pulses generated by the voltage/frequency converter, and as the defined number of pulses is counted, it controls interface to output the next digit bit.

3. A decoding circuit for executing a decoding method for transforming a sequence of pulse groups into a series of binary digits generated from binary digits "0" and "1", the sequence of pulse groups comprising of pulse groups which have two different special defined pulse frequencies and have same defined number of pulses thereby having different duration times, said defined number being at least two, the decoding method comprising dividing the sequence of pulse groups into pulse groups according to the same defined number of pulses; measuring duration times of the pulse groups, and transforming the pulse groups into binary digits "0" or "1" according to the different duration times of the pulse groups, said decoding circuit comprising a decoding module for dividing said sequence of pulse groups into the pulse groups according to the same defined number and for measuring the duration time of each pulse group and then converting the duration time differences into binary digits "0" or "1";

wherein said decoding module comprises a binary counter for counting the pulses in the sequence of pulse groups, as the defined number of pulses is reached, it controls the pulse group duration time measurement unit to measure the pulse group duration time;

a pulse group duration time measurement unit for measuring the duration time of the pulse groups and output "low" or "high" voltage levels according to the difference of the duration time of the pulse groups for expressing the binary digits "0" or "1"; and an interface for receiving the voltage outputs from the pulse group duration time measurement unit, and converting them as the binary logical voltage levels.

4. A digital signal transmission circuit, comprising:

a medium for signal transfer;

a coding module at a transmission side for converting binary digits as a sequence of pulse groups, the binary digits "0" and "1" are corresponding to pulse groups with two special pulse frequencies and with same defined number of pulses, the pulse groups have same defined pulse number and different duration times; the defined pulse number is at least two;

a band filer and amplifier module located at a reception side for signal band filtering and amplifying;

a synchronous module connected with the band filter and amplifier module for synchronizing the signal transmission and reception and dividing the sequence of pulse groups into said pulse groups; and a decoding module connected with the synchronous module for dividing the sequence of the pulse groups into the pulse groups according to the same defined number and for measuring the duration time of each pulse group and then converting the duration time difference into binary digits "0" or "1";

wherein said coding module comprises a interface for converting the transmission signal into serial signal and sending the serial logical voltage level to the voltage level transfer circuit;

a voltage level transfer circuit for converting the serial logical voltage levels into two special voltage levels corresponding to the two special frequencies;

a voltage/frequency converter for generating pulses with the two special frequencies according to the input two special voltage levels; and a binary counter for counting the pulses output from the voltage/frequency converter, and as the defined number is reached, it controls the interface to output another bit.

5. A digital signal transmission circuit, comprising:

a medium for signal transfer;

a coding module at a transmission side for converting binary digits as a sequence of pulse groups, the binary digits "0" and "1" are corresponding to pulse groups with two special pulse frequencies and with same defined number of pulses, the pulse groups have same defined pulse number and different duration times; the defined pulse number is at least two;

a band filer and amplifier module located at a reception side for signal band filtering and amplifying;

a synchronous module connected with the band filter and amplifier module for synchronizing the signal transmission and reception and dividing the sequence of pulse groups into said pulse groups; and a decoding module connected with the synchronous module for dividing the sequence of the pulse groups into the pulse groups according to the same defined number and for measuring the duration time of each pulse group and then converting the duration time difference into binary digits "0" or "1", wherein said synchronous module comprises a pulse canceling circuit for each time canceling one pulse; and a comparator for comparing the number output from decoding module with a pre-selected mark number, if it is not the same, it controls the pulse canceling circuit to cancel one pulse from the sequence of the pulse groups, whereas if it is the same, the pulse canceling circuit will not work.

6. A digital signal transmission circuit, comprising:

a medium for signal transfer;

a coding module at a transmission side, for converting binary digits as a sequence of pulse groups, the binary digits "0" and "1" are corresponding to pulse groups with two special pulse frequencies and with same defined number of pulses, the pulse groups have the same defined pulse number and different duration times; the defined pulse number is at least two;

a band filer and amplifier module located at a reception side for signal band filtering and amplifying;

a synchronous module connected with the band filter and amplifier module for synchronizing the signal transmission and reception and dividing the sequence of pulse groups into said pulse groups; and a decoding module connected with the synchronous module for dividing the sequence of the pulse groups into the pulse groups according to the same defined number and for measuring the duration time of each pulse group and then converting the duration time difference into binary digits "0" or "1,"

wherein said decoding module comprises a binary counter for counting the pulses in the sequence of pulse groups; as the defined number is reached, it controls the pulse group duration time measurement unit to measure the duration time of the pulse groups; and a pulse group duration time measurement unit for measuring the pulse group duration time and converting the pulse group duration time differences into binary digits "0" and "1".

* * * * *